(12) United States Patent
Puntambekar et al.

(10) Patent No.: US 10,237,608 B2
(45) Date of Patent: Mar. 19, 2019

(54) SYSTEMS AND METHODS FOR EVALUATING SYNCHRONIZATION BETWEEN CONTENT STREAMS

(71) Applicant: Facebook, Inc., Menlo Park, CA (US)

(72) Inventors: Amit Puntambekar, Fremont, CA (US); Michael Hamilton Coward, Solana Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/264,252

(22) Filed: Sep. 13, 2016

(65) Prior Publication Data
US 2018/0077445 A1  Mar. 15, 2018

(51) Int. Cl.
| | |
|---|---|
| H04N 21/43 | (2011.01) |
| H04N 21/84 | (2011.01) |
| H04N 21/234 | (2011.01) |
| H04N 21/414 | (2011.01) |
| H04N 21/462 | (2011.01) |
| H04N 21/8547 | (2011.01) |

(52) U.S. Cl.
CPC ... *H04N 21/4305* (2013.01); *H04N 21/23418* (2013.01); *H04N 21/41407* (2013.01); *H04N 21/4622* (2013.01); *H04N 21/84* (2013.01); *H04N 21/8547* (2013.01)

(58) Field of Classification Search
None
See application file for complete search history.

(56) References Cited

U.S. PATENT DOCUMENTS

| | | | | |
|---|---|---|---|---|
| 6,282,300 | B1* | 8/2001 | Bloom | G06T 1/0064 382/100 |
| 8,214,175 | B2* | 7/2012 | Moskowitz | G06F 17/30964 341/155 |
| 2002/0150247 | A1* | 10/2002 | Linnartz | G06T 1/0021 380/205 |
| 2005/0271246 | A1* | 12/2005 | Sharma | G06Q 20/3823 382/100 |
| 2011/0112669 | A1* | 5/2011 | Scharrer | G10L 19/008 700/94 |
| 2017/0109858 | A1* | 4/2017 | Jiang | G06T 1/0028 |

* cited by examiner

*Primary Examiner* — Hoang Vu A Nguyen Ba
(74) *Attorney, Agent, or Firm* — Sheppard Mullin Richter & Hampton LLP

(57) ABSTRACT

Systems, methods, and non-transitory computer-readable media can generate a first set of fingerprints that correspond to at least one media stream of a content item. A second set of fingerprints that correspond to at least one media stream of an encoded version of the content item are generated. A first curve is generated based at least in part on the first set of fingerprints. A second curve is generated based at least in part on the second set of fingerprints. A determination is made whether the encoded version of the content item is synchronized based at least in part on the first curve and the second curve.

20 Claims, 8 Drawing Sheets

SYSTEMS AND METHODS FOR EVALUATING SYNCHRONIZATION BETWEEN CONTENT STREAMS

FIELD OF THE INVENTION

The present technology relates to the field of content encoding. More particularly, the present technology relates to techniques for evaluating encoded content.

BACKGROUND

Today, people often utilize computing devices (or systems) for a wide variety of purposes. Users can use their computing devices to, for example, interact with one another, access content, share content, and create content. For example, users can stream content through their computing devices. In general, content can be streamed from a content provider that sends encoded data (e.g., audio, video, or both) to a computing device of an end-user. The computing device receiving the streamed data can decode and present the content through the computing device.

SUMMARY

Various embodiments of the present disclosure can include systems, methods, and non-transitory computer readable media configured to generate a first set of fingerprints that correspond to at least one media stream of a content item. A second set of fingerprints that correspond to at least one media stream of an encoded version of the content item are generated. A first curve is generated based at least in part on the first set of fingerprints. A second curve is generated based at least in part on the second set of fingerprints. A determination is made whether the encoded version of the content item is synchronized based at least in part on the first curve and the second curve.

In an embodiment, the systems, methods, and non-transitory computer readable media are configured to determine a respective fingerprint for at least some frames corresponding to the at least one media stream, wherein each fingerprint measures a complexity of the frame.

In an embodiment, the complexity of the frame is determined based on at least one of a chroma value corresponding to the frame, a luma value corresponding to the frame, a number of bits corresponding to the frame, a frequency corresponding to the frame, a weight of the frame, or a combination thereof.

In an embodiment, the systems, methods, and non-transitory computer readable media are configured to generate a plot of the first set of fingerprints with respect to time.

In an embodiment, the systems, methods, and non-transitory computer readable media are configured to determine a measure of similarity between the first curve and the second curve based at least in part on a curve fitting algorithm and determine that an audio stream and a video stream of the encoded version of the content item are not synchronized based at least in part on the measure of similarity.

In an embodiment, the systems, methods, and non-transitory computer readable media are configured to determine a respective first fingerprint for at least some frames corresponding to the audio stream over a first period of time, determine a respective second fingerprint for at least some frames corresponding to the video stream over the first period of time, and determine a set of combined fingerprints from the first fingerprints and the second fingerprints.

In an embodiment, the systems, methods, and non-transitory computer readable media are configured to cause the encoded version of the content item to be flagged for further review by quality assurance personnel.

In an embodiment, the systems, methods, and non-transitory computer readable media are configured to cause the encoded version of the content item to be flagged for re-encoding.

In an embodiment, the media stream of the content item and the media stream of the encoded version of the content item are both audio streams.

In an embodiment, the media stream of the content item and the media stream of the encoded version of the content item are both video streams.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
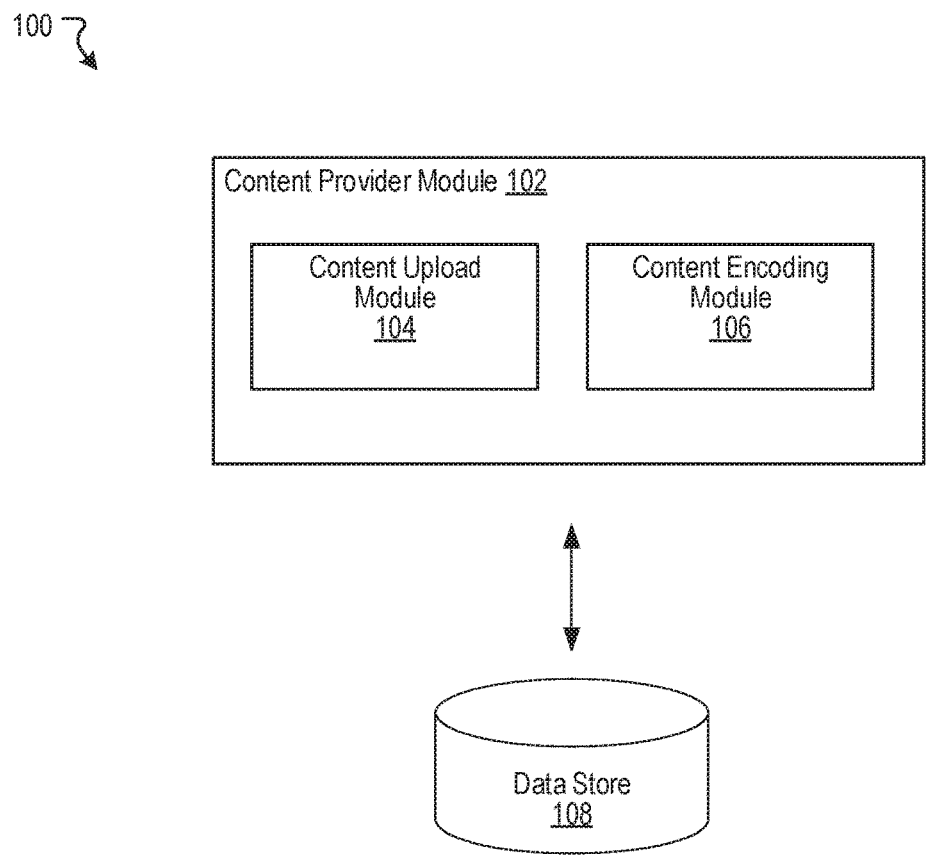
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Evaluating Content Synchronization

Today, people often utilize computing devices (or systems) for a wide variety of purposes. Users can use their computing devices to, for example, interact with one another, access content, share content, and create content. For example, users can stream content through their computing devices. In general, content can be streamed from a content provider that sends encoded data (e.g., audio, video, or both) to a computing device of an end-user over a network (e.g., the Internet). The computing device receiving the streamed data can decode and present the content, for example, through a display screen of the computing device. For example, a video that includes both a video stream and an audio stream can be encoded using one or more codecs (e.g., H.264). In this example, the computing device of the end-user can decode the encoded video using the appropriate codecs so that the video (i.e., the video stream and the audio stream) can be presented.

In some instances, the video stream and the audio stream of a content item may become unsynchronized during the encoding process. Such synchronization issues may arise, for example, when the start offsets for the audio stream and the video stream are not propagated from input to output. In another example, synchronization issues can arise during encoding when frames are dropped from the audio stream and/or video stream, thereby leading to a progressive loss in synchronization. Synchronization issues can also arise in distributed encoding pipelines when one or more segments of the content item may become corrupted or dropped.

The loss of synchronization between audio and video streams is noticeable during video playback and such synchronization issues can degrade the user experience. One approach for identifying such synchronization issues involves the use of quality assurance personnel that individually confirm adequate synchronization of the respective audio and video streams of encoded videos, for example, by individually reviewing a playback of each encoded video. However, given the vast amount of content being encoded and distributed by content providers, such manual approaches for ensuring content synchronization are not optimal. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, the synchronization of any video streams and audio streams corresponding to an encoded (or transcoded) content item is confirmed algorithmically without necessarily requiring quality assurance personnel. For example, in some embodiments, the respective audio stream and video stream of a content item can be fingerprinted prior to the content item being encoded (or transcoded). After the content item has been encoded (or transcoded), the respective audio stream and video stream of the content item can again be fingerprinted. In some embodiments, when generating fingerprints for a stream (e.g., audio stream or video stream), a separate fingerprint is determined for each frame in the stream. A fingerprint for a frame may be determined based on various attributes of the frame. For example, a fingerprints for a video frame may be determined based on one or more values that correspond to chroma, luma, the number of bits that correspond to the frame, the type of frame, and motion estimation. In another example, a fingerprint for an audio frame may be determined based on one or more values that correspond to the number of bits that correspond to the frame, frequency, and weight of the frame. A fingerprint, therefore, can describe an amount of complexity of a given frame.

Once computed, the fingerprints determined for each frame of each stream can be plotted. For example, the fingerprints corresponding to frames in the audio stream of the original content item (the content item prior to encoding) can be plotted with respect to the fingerprints corresponding to frames in the audio stream of the encoded (or transcoded) version of the content item. Similarly, the fingerprints corresponding to frames in the video stream of the original content item (the content item prior to encoding) can be plotted with respect to the fingerprints corresponding to frames in the video stream of the encoded (or transcoded) version of the content item. The plotted curves can then be used to determine whether the encoded (or transcoded) version of the content item is synchronized with the original content item.

FIG. 1 illustrates an example system 100 including an example content provider module 102, according to an embodiment of the present disclosure. As shown in the example of FIG. 1, the content provider module 102 can include a content upload module 104 and a content encoding module 106. In some instances, the example system 100 can include at least one data store 108. The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 108, as shown in the example system 100. The at least one data store 108 can be configured to store and maintain data such as content items that are accessible through the content provider module 102. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

The content upload module 104 is configured to allow content items to be uploaded. For example, users of a social networking system may upload content items (e.g., videos) using the content upload module 104. Such content items may be distributed, or shared, with other users of the social networking system. In one example, content items may be uploaded through an interface (e.g., graphical user interface and/or application programming interface) provided by the content upload module 104.

The content encoding module 106 is configured to encode content items that are to be distributed through the content provider module 102. In some embodiments, the content encoding module 106 is also configured to test, or evaluate, encoded (or transcoded) content items to ensure synchronization between the respective audio and video streams that correspond to the encoded (or transcoded) content items. More details regarding the content encoding module 106 will be provided below with reference to FIG. 2.

Figure 2:
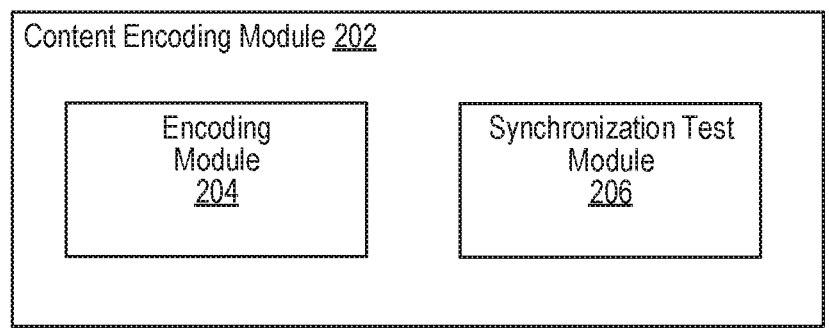
FIG. 2 illustrates an example of a content encoding module, according to an embodiment of the present disclosure.

FIG. 2 illustrates an example of a content encoding module 202, according to an embodiment of the present disclosure. In some embodiments, the content encoding module 106 of FIG. 1 can be implemented as the content encoding module 202. As shown in FIG. 2, the content encoding module 202 can include an encoding module 204 and a synchronization test module 206.

In various embodiments, the encoding module 204 is configured to encode content items for distribution to various computing devices. In general, the encoding process involves transforming content items into one or more different formats that are able to be interpreted by various software applications and/or devices (e.g., browsers, video players, computing devices, etc.). For example, a content item that was uploaded by a user of a social networking system may be in a format that is not supported by a certain video player or certain type of computing device. In this example, the uploaded content item can be encoded (or transcoded), for example, using one or more codecs, into a format that is supported by the video player or the computing device. Thus, in some instances, there may be many different encoded (or transcoded) versions of the same content item. In general, a codec is software that allows for compression and/or decompression of digital video and audio data. Some example codecs include DivX, H.264, and Windows Media Video (WMV).

As mentioned, in some instances, the video stream and the audio stream of a content item may become unsynchronized during the encoding process. A mismatch between the audio stream and the video stream of the content item can result in the visual portions of the video not corresponding to the audio portions of the video (e.g., lip sync error), for example. This loss of synchronization between the audio and video streams can degrade the user experience and may affect user engagement. Thus, in various embodiments, unsynchronized content items can automatically be identified and appropriate action can be taken against such content items.

In various embodiments, the synchronization test module 206 can analyze an input content item (e.g., uploaded video) with respect to an encoded (or transcoded) version of the content item to determine whether the encoded (or transcoded) version of the content item is synchronized. In some instances, the synchronization test module 206 may analyze a content item for synchronization as soon as the content item has been uploaded and encoded (or transcoded). In some instances, the synchronization test module 206 may be configured to analyze content items that have previously been encoded (or transcoded) and made available through the content provider to automatically identify unsynchronized content items and allow appropriate action to be taken against such content items.

In some embodiments, when analyzing an input content item, the synchronization test module 206 generates i) a first set of fingerprints that correspond to the audio stream of the input content item (e.g., the version of the content item prior to encoding) and ii) a second set of fingerprints that correspond to the video stream of the input content item. Similarly, the synchronization test module 206 generates i) a first set of fingerprints that correspond to the audio stream of the input content item after encoding (or transcoding) (e.g., the encoded, or transcoded, version of the content item) and ii) a second set of fingerprints that correspond to the video stream of the input content item after encoding (or transcoding).

In general, a fingerprint for a frame may be determined based on one or more attributes and/or characteristics of the frame. In some embodiments, a fingerprint for a video frame may be determined based on a chroma value, a luma value, a bitrate corresponding to the video frame, motion in the frame, or any combination thereof. In some embodiments, a fingerprint for an audio frame may be determined based on a bitrate corresponding to the audio frame, a frequency corresponding to the audio frame, the weight of the audio frame, or any combination thereof.

The synchronization test module 206 can individually plot the respective fingerprints that were determined for the audio and video streams corresponding to the input content item as well as the respective fingerprints that were determined for the audio and video streams corresponding to the encoded (or transcoded) content item, as illustrated in the example of FIG. 3, which is discussed in more detail below. Each fingerprint can be plotted with respect to time. Thus, for example, the fingerprints can be plotted on a graph having a first axis that corresponds to the fingerprint complexity value (e.g., chroma value, luma value, bitrate, etc.) and a second axis that corresponds to time (e.g., frame number, a time in which the frame appears in the video, etc.).

The synchronization test module 206 can measure synchronization between the respective streams by evaluating the plotted curves. In some embodiments, the curve corresponding to the audio stream of the original content item (prior to encoding) and the curve corresponding to the audio stream of the encoded (or transcoded) content item are evaluated using correlation techniques. Any generally known correlation techniques may be used when evaluating the curves including, for example, Sum of Absolute Differences (SAD), correlation algorithms, and curve fitting. In some embodiments, a mismatch between the two audio streams is indicative of a synchronization error. Such mismatch may be determined when the measure of synchronization, e.g., the SAD value, for two audio streams does not satisfy a threshold value, for example.

Similarly, the synchronization test module 206 can measure synchronization between the curve corresponding to the video stream of the original content item (e.g., prior to encoding) and the curve corresponding to the video stream of the encoded (or transcoded) content item using correlation techniques. Again, any generally known correlation techniques may be used when evaluating the curves. In some embodiments, a mismatch between the two video streams is indicative of a synchronization error. Such mismatch may be determined when the measure of synchronization, e.g., the SAD value, for two video streams does not satisfy a threshold value, for example.

Depending on the implementation, the synchronization test module 206 may be configured to test synchronization of a content item by analyzing only the audio stream of the original version of the content item and the audio stream of the encoded (or transcoded) version of the content item, or analyzing only the video stream of the original version of the content item and the video stream of the encoded (or transcoded) version of the content item, or both. Although the referenced examples refer to an input content item and an encoded (or transcoded) version of the input content item, the approaches described herein may be adapted to test synchronization between any two versions of the same content item. For example, the input content item may correspond to a first encoded (or transcoded) version of the content item and this first encoded version may be evaluated with respect to a second encoded (or transcoded) version of the content item.

In some embodiments, upon determining a mismatch between the two audio streams and/or the two video streams, the synchronization test module 206 can flag the content item as having synchronization issues and a number of different actions may be taken against the flagged content item. In some embodiments, a flagged content item is provided to quality assurance personnel for further review and processing. In some embodiments, a flagged content item is re-submitted to the encoding pipeline for re-encoding. In some embodiments, the original version of the flagged content item (e.g., the version prior to encoding or a different encoding) is made available through the content provider rather than the encoded (or transcoded) version of the flagged content item that was determined to be unsynchronized. In some embodiments, selected portions of the original version of the flagged content item and the encoded (or transcoded) version of the flagged content item can be presented. For example, the encoded (or transcoded) version of the flagged content item can be provided by the content provider up until the audio stream and video stream of the encoded (or transcoded) version become unsynchronized and then the content provider can provide the original version of the flagged content item for the remaining duration of the video. In such embodiments, if the encoded (or transcoded) version has multiple unsynchronized portions, then the content provider can alternate between providing the encoded (or transcoded) version and the original version, as appropriate.

Figure 4:
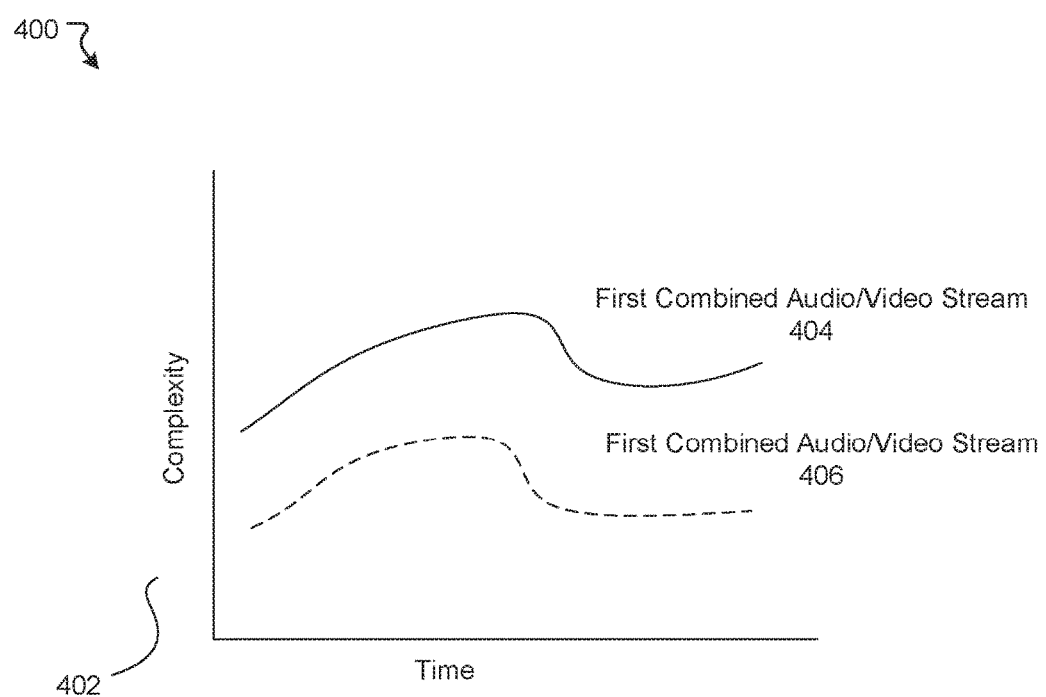
FIG. 4 illustrates an example approach for evaluating content audio-video synchronization, according to an embodiment of the present disclosure.

As described above, one approach for testing synchronization in an encoded (or transcoded) content item involves separately comparing the audio stream of the content item and the audio stream of the encoded (or transcoded) version of the content item and/or comparing the video stream of the content item and the video stream of the encoded (or transcoded) version of the content item. In some embodiments, rather than analyzing multiple streams, the synchronization test module 206 plots fingerprints for a combined audio stream and video stream of the original version of the content item and fingerprints for a combined audio stream and video stream of the encoded (or transcoded) version of the content item, as illustrated in the example of FIG. 4, which is discussed in more detail below.

In such embodiments, when analyzing an input content item, the synchronization test module 206 generates i) a first set of fingerprints that correspond to the audio stream of the input content item (e.g., the version of the content item prior to encoding) and ii) a second set of fingerprints that correspond to the video stream of the input content item, as described above. Similarly, the synchronization test module 206 generates i) a first set of fingerprints that correspond to the audio stream of the input content item after encoding (or transcoding) (e.g., the encoded, or transcoded, version of the content item) and ii) a second set of fingerprints that correspond to the video stream of the input content item after encoding. The synchronization test module 206 can then combine the first and second sets of fingerprints that were generated for the audio stream and video stream of the input content item. For example, in some embodiments, a fingerprint of an audio frame and a fingerprint of a corresponding video frame of the input content item are combined by as follows:

$$C = \frac{V}{A},$$

where V corresponds to the fingerprint complexity value of the video frame, where A corresponds to the fingerprint complexity value of the audio frame, and where C is the combined complexity value of the two fingerprints. Naturally, other approaches may be used to combine the two fingerprints. For example, the value C may be determined by dividing A by V, by adding A and V, by multiplying A and V, computing a logarithm of the combined A and V, to name some examples.

Similarly, the synchronization test module 206 can combine the first and second sets of fingerprints that were generated for the audio stream and video stream of the encoded (or transcoded) version of the input content item, as described above.

The synchronization test module 206 can individually plot the respective combined fingerprints that were determined for the audio and video streams corresponding to the input content item as well as the respective combined fingerprints that were determined for the audio and video streams corresponding to the encoded (or transcoded) content item, as illustrated in the example of FIG. 4. Once plotted, the synchronization test module 206 can measure synchronization between the respective streams by evaluating the plotted curves, as described above.

In some embodiments, when generating a set of fingerprints for a stream, the fingerprints are determined using some of the frames in the stream (e.g., every other frame, every nth frame, etc.). Thus, in such embodiments, a respective fingerprint may be generated for every other frame (e.g., audio frame or video frame) in the stream. In some embodiments, a fingerprint is generated for each frame in the stream. In some embodiments, a fingerprint is generated for multiple frames in the stream. Naturally, the frames, or sequence of frames, used to generate a set of fingerprints can vary depending on the implementation. In some embodiments, a stream may be segmented into smaller portions and these segments may be analyzed for synchronization separately. In other words, a separate set of fingerprints may be generated for each segment of the audio stream and these fingerprints can be used to determine whether a mismatch in synchronization exists between a segment of an original version and a segment of an encoded (or transcoded) version of a content item.

Figure 3A:
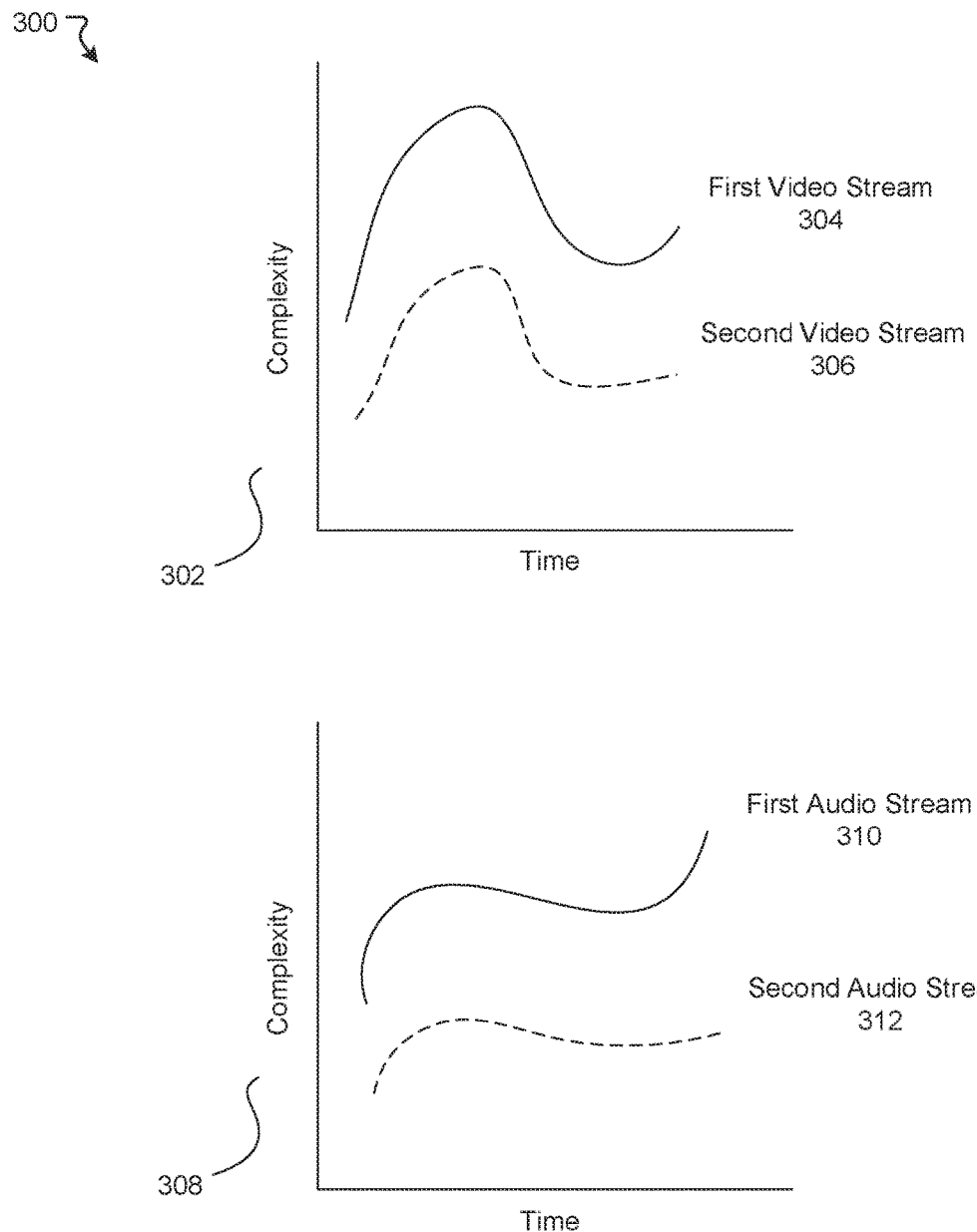
FIGS. 3A-B illustrate example approaches for evaluating content audio-video synchronization, according to an embodiment of the present disclosure.

FIG. 3A illustrates an example approach 300 for evaluating content audio-video synchronization, according to an embodiment of the present disclosure. FIG. 3A includes an example graph 302 and graph 308 in which fingerprints of an input content item and a version of the input content item have been plotted with respect to time. In this example, the fingerprints for the input content item may have been determined using frames in the input content item over a period of time and the fingerprints for the version of the input content item may have been determined using frames in the version of the input content item over the same period of time. In some embodiments, the input content item corresponds to an original content item and the version of the input content item is an encoded version of the input content item. In some embodiments, the input content item corresponds to an original content item and the version of the input content item is a transcoded version of the input content item. In some embodiments, the input content item corresponds to a first encoded version of a content item and the version of the input content item is a second encoded version of the content item. In some embodiments, the input content item corresponds to a first transcoded version of a content item and the version of the input content item is a second transcoded version of the content item.

In this example, the graph 302 is used to plot fingerprints that were generated from the video streams corresponding to the input content item and the version of the input content item. The graph 302 includes a curve 304 that was generated by plotting a set of fingerprints that were determined from a video stream corresponding to the input content item. The graph 302 also includes a curve 306 that was generated by plotting a set of fingerprints that were determined from a video stream corresponding to the version of the input content item. In this example, synchronization between the respective streams can be determined by evaluating the plotted curves 304 and 306. In this example, a mismatch between the curves 304 and 306 is indicative of a synchronization error. Such mismatch may be determined when the measure of synchronization, e.g., the SAD value, for the curves 304 and 306 does not satisfy a threshold value, for example. In some embodiments, a different mismatch threshold is utilized depending on the type of comparison. For example, a first threshold may be applied if the first video stream corresponds to a first encoded version of a content item and the second video stream corresponds to a second encoded version of the content item. In this example, a second threshold may be applied if the first video stream corresponds to a first transcoded version of a content item and the second video stream corresponds to a second transcoded version of the content item.

In this example, the graph 308 is used to plot fingerprints that were generated from the audio streams corresponding to the input content item and the version of the input content item. The graph 308 includes a curve 310 that was generated by plotting a set of fingerprints that were determined from an audio stream corresponding to the input content item. The graph 308 also includes a curve 312 that was generated by plotting a set of fingerprints that were determined from an audio stream corresponding to the version of the input content item. In this example, synchronization between the respective streams can be determined by evaluating the plotted curves 310 and 312. In this example, a mismatch between the curves 310 and 312 is indicative of a synchronization error. Such mismatch may be determined when the measure of synchronization, e.g., the SAD value, for the curves 310 and 312 does not satisfy a threshold value, as described above. In some embodiments, mismatch between the curves 304 and 306 or a mismatch between the curves 310 and 312 is sufficient to determine that a synchronization error exists between the input content item and the version of the content item. In some embodiments, a different mismatch threshold is utilized depending on the type of comparison. For example, a first threshold may be applied if the first audio stream corresponds to a first encoded version of a content item and the second audio stream corresponds to a second encoded version of the content item. In this example, a second threshold may be applied if the first audio stream corresponds to a first transcoded version of a content item and the second audio stream corresponds to a second transcoded version of the content item.

Figure 3B:
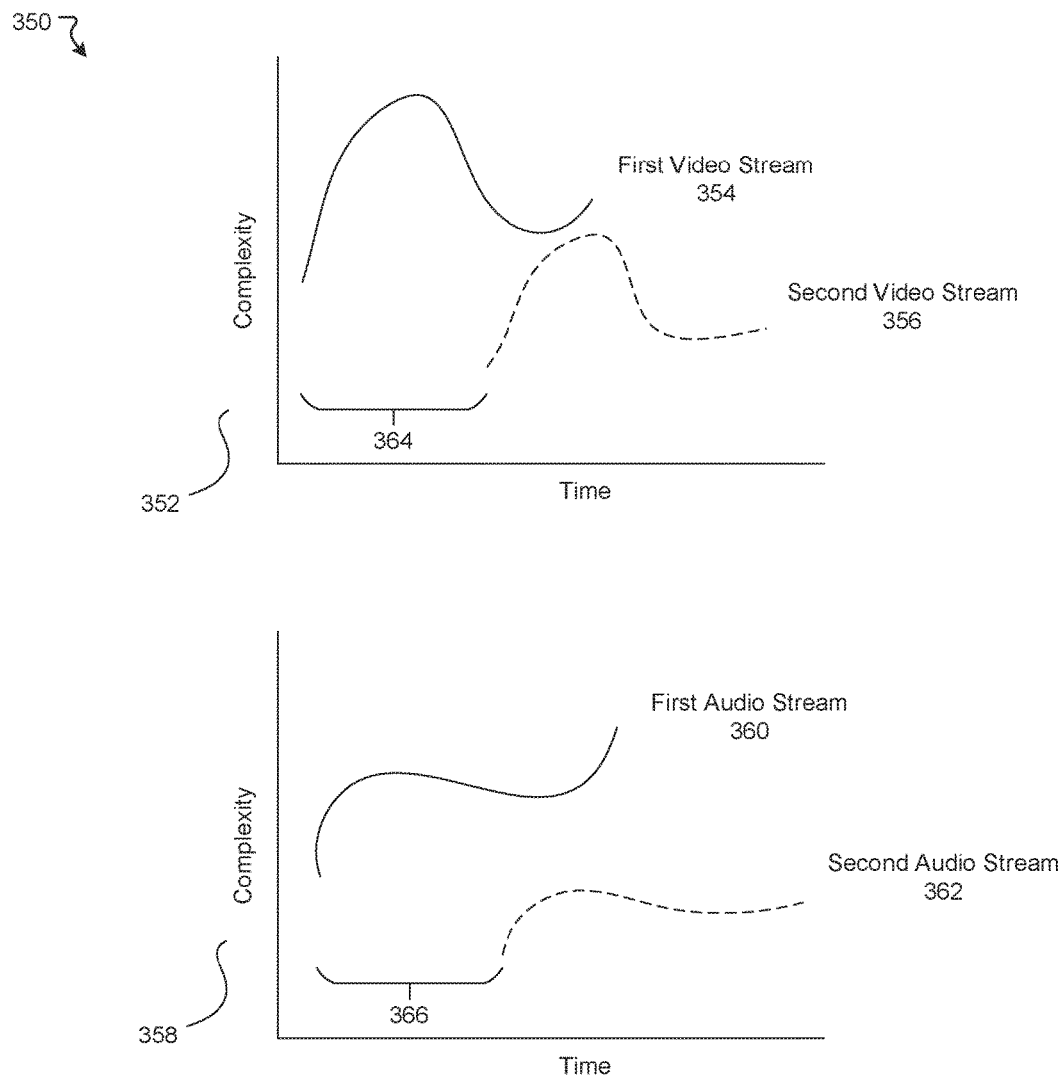

FIG. 3B illustrates an example approach 350 for evaluating content audio-video synchronization, according to an embodiment of the present disclosure. FIG. 3B includes an example graph 352 and graph 358 in which fingerprints of an input content item and a version of the input content item have been plotted with respect to time, as described in reference to FIG. 3A. In the example of FIG. 3B, the curves 354 and 356 are illustrated as being out of alignment (or non-correlated). Similarly, the curves 360 and 362 are also shown as being out of alignment (or non-correlated). In various embodiments, the approaches described herein can measure a time difference or lag (e.g., delta t) between the curves. For example, the graph 352 can be used to measure a lag 364 between the curve 354 and the curve 356. Similarly, the graph 358 can be used to measure a lag 366 between the curve 360 and the curve 362.

FIG. 4 illustrates an example approach 400 for evaluating content audio-video synchronization, according to an embodiment of the present disclosure. FIG. 4 includes an example graph 402 in which combined fingerprints of an input content item and a version of the input content item have been plotted with respect to the frames for which the fingerprints were determined. In some embodiments, the input content item corresponds to an original content item and the version of the input content item is an encoded version of the input content item. In some embodiments, the input content item corresponds to an original content item and the version of the input content item is a transcoded version of the input content item. In some embodiments, the input content item corresponds to a first encoded version of a content item and the version of the input content item is a second encoded version of the content item. In some embodiments, the input content item corresponds to a first transcoded version of a content item and the version of the input content item is a second transcoded version of the content item.

The graph 402 includes a curve 404 that was generated by plotting a set of combined fingerprints that were determined from an audio stream and a video stream corresponding to the input content item over some period of time. The graph 402 also includes a curve 406 that was generated by plotting a set of combined fingerprints that were determined from an audio stream and a video stream corresponding to the version of the input content item over the same period of time. In this example, synchronization between the input content item and the version of input content item can be determined by evaluating the plotted curves 404 and 406. In this example, a mismatch between the curves 404 and 406 is indicative of a synchronization error. Such mismatch may be determined when the measure of synchronization, e.g., the SAD value, for the curves 404 and 406 does not satisfy a threshold value, as described above. In some embodiments, a different mismatch threshold is utilized depending on the type of comparison, as described above.

Figure 5:
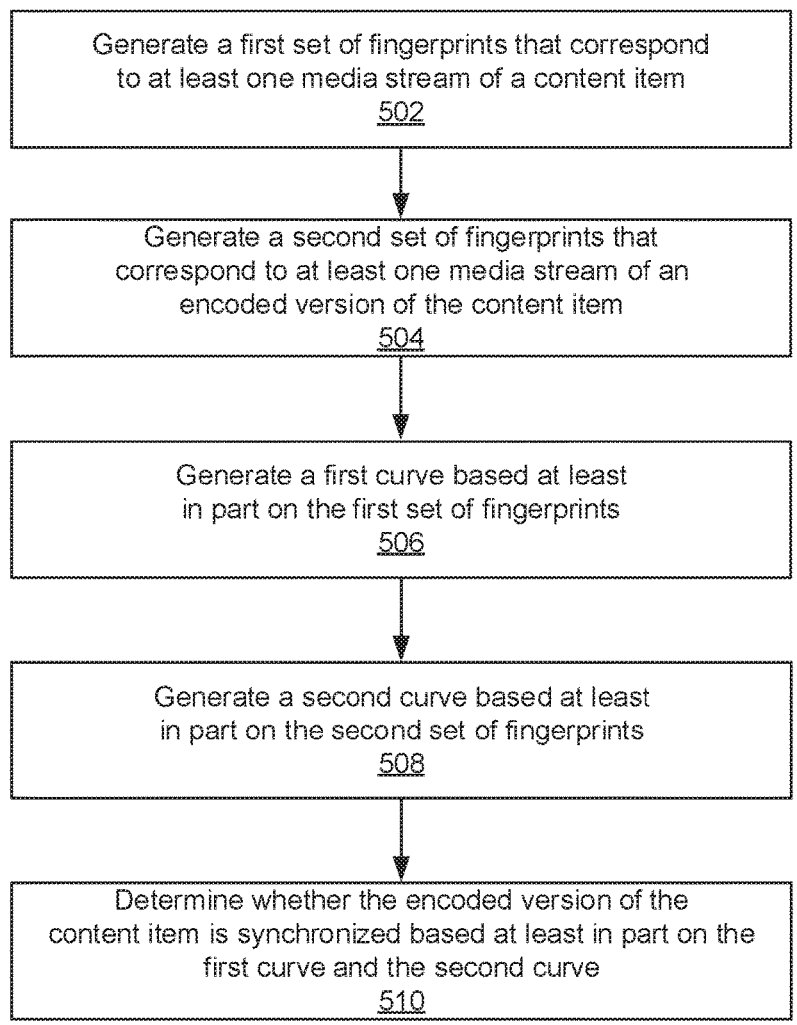
FIG. 5 illustrates an example process for evaluating content audio-video synchronization, according to various embodiments of the present disclosure.

FIG. 5 illustrates an example process for evaluating content audio-video synchronization, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a first set of fingerprints that correspond to at least one media stream of a content item are generated. At block 504, a second set of fingerprints that correspond to at least one media stream of an encoded (or transcoded) version of the content item are generated. At block 506, a first curve is generated based at least in part on the first set of fingerprints. At block 508, a second curve is generated based at least in part on the second set of fingerprints. At block 510, a determination is made whether the encoded (or transcoded) version of the content item is synchronized based at least in part on the first curve and the second curve.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
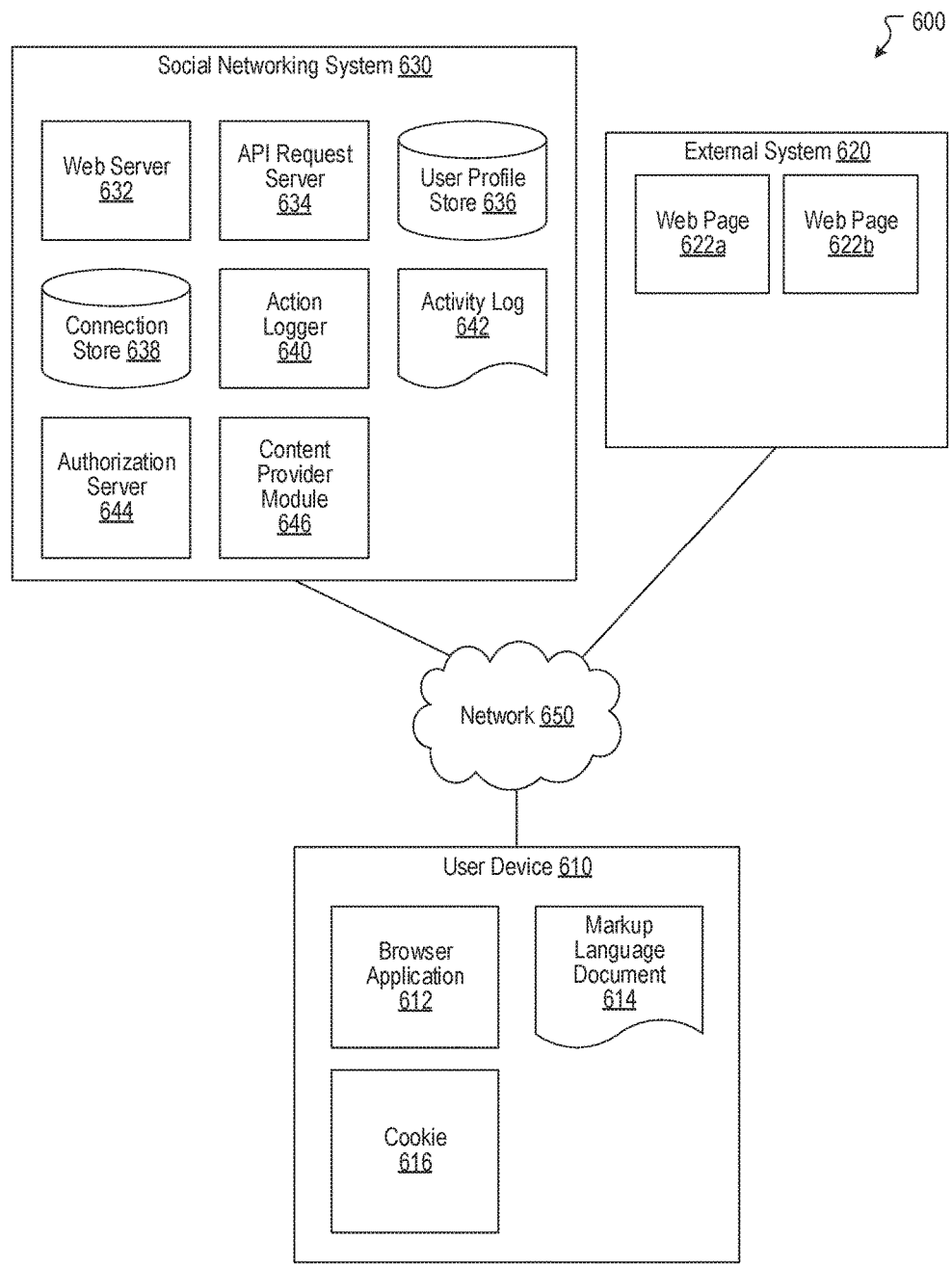
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, some, or all, of the functionality of the content provider module 646 is implemented in the user device 610. As discussed previously, it should be appreciated that there can be many variations or other possibilities.

Hardware Implementation

Figure 7:
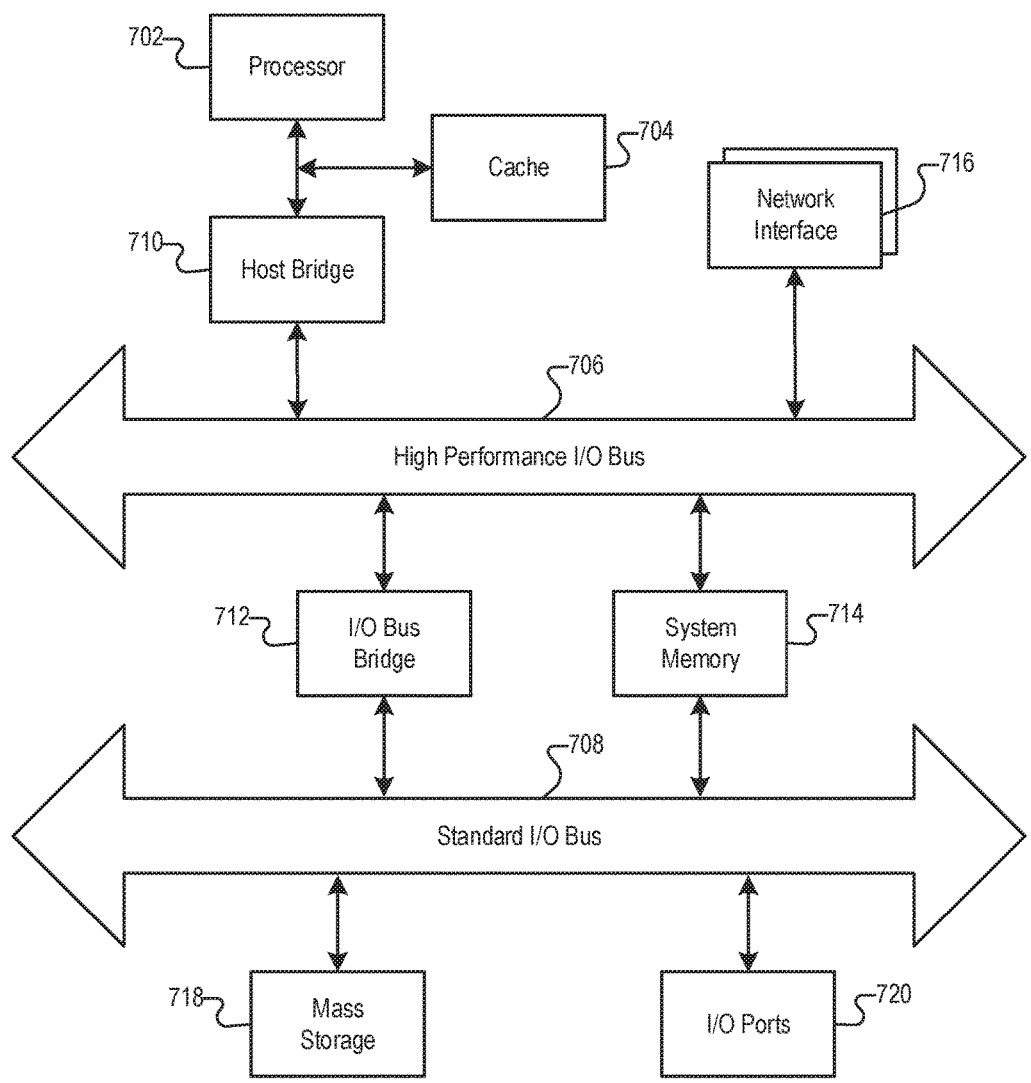
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, a first set of fingerprints that correspond to at least one media stream of a content item, the first set of fingerprints being generated from one or more frames in the media stream of the content item;
   generating, by the computing system, a second set of fingerprints that correspond to at least one media stream of an encoded version of the content item, the second set of fingerprints being generated from one or more frames in the media stream of the encoded version of the content item;
   plotting, by the computing system, a first curve based at least in part on the first set of fingerprints;
   plotting, by the computing system, a second curve based at least in part on the second set of fingerprints; and
   determining, by the computing system, whether the encoded version of the content item is synchronized based at least in part on the plotted first curve and the second curve.

2. The computer-implemented method of claim 1, wherein generating the first set of fingerprints that correspond to the at least one media stream of the content item further comprises:
   determining, by the computing system, a respective fingerprint for at least some frames corresponding to the at least one media stream, wherein each fingerprint measures a complexity of the frame.

3. The computer-implemented method of claim 1, wherein the complexity of the frame is determined based on at least one of a chroma value corresponding to the frame, a luma value corresponding to the frame, a number of bits corresponding to the frame, a frequency corresponding to the frame, a weight of the frame, or a combination thereof.

4. The computer-implemented method of claim 1, wherein plotting the first curve based at least in part on the first set of fingerprints further comprises:
   generating, by the computing system, a plot of the first set of fingerprints with respect to time.

5. The computer-implemented method of claim 1, wherein determining whether the content item and the encoded version of the content item are synchronized further comprises:
   determining, by the computing system, a measure of similarity between the first curve and the second curve based at least in part on a correlation technique; and
   determining, by the computing system, that an audio stream and a video stream of the encoded version of the content item are not synchronized based at least in part on the measure of similarity.

6. The computer-implemented method of claim 1, wherein the at least one media stream comprises an audio stream and a video stream, and wherein generating the first set of fingerprints that correspond to a media stream of a content item further comprises:
   determining, by the computing system, a respective first fingerprint for at least some frames corresponding to the audio stream over a first period of time;
   determining, by the computing system, a respective second fingerprint for at least some frames corresponding to the video stream over the first period of time; and
   determining, by the computing system, a set of combined fingerprints from the first fingerprints and the second fingerprints.

7. The computer-implemented method of claim 6, the method further comprising:
   causing, by the computing system, the encoded version of the content item to be flagged for further review by quality assurance personnel.

8. The computer-implemented method of claim 6, the method further comprising:
   causing, by the computing system, the encoded version of the content item to be flagged for re-encoding.

9. The computer-implemented method of claim 1, wherein the media stream of the content item and the media stream of the encoded version of the content item are both audio streams.

10. The computer-implemented method of claim 1, wherein the media stream of the content item and the media stream of the encoded version of the content item are both video streams.

11. A system comprising:
    at least one processor; and
    a memory storing instructions that, when executed by the at least one processor, cause the system to perform:
       generating a first set of fingerprints that correspond to at least one media stream of a content item, the first set of fingerprints being generated from one or more frames in the media stream of the content item;
       generating a second set of fingerprints that correspond to at least one media stream of an encoded version of the content item, the second set of fingerprints being generated from one or more frames in the media stream of the encoded version of the content item;
       plotting a first curve based at least in part on the first set of fingerprints;
       plotting a second curve based at least in part on the second set of fingerprints; and
       determining whether the encoded version of the content item is synchronized based at least in part on the plotted first curve and the second curve.

12. The system of claim 11, wherein generating the first set of fingerprints that correspond to the at least one media stream of the content item further causes the system to perform:
    determining a respective fingerprint for at least some frames corresponding to the at least one media stream, wherein each fingerprint measures a complexity of the frame.

13. The system of claim 11, wherein the complexity of the frame is determined based on at least one of a chroma value corresponding to the frame, a luma value corresponding to the frame, a number of bits corresponding to the frame, a frequency corresponding to the frame, a weight of the frame, or a combination thereof.

14. The system of claim 11, wherein plotting the first curve based at least in part on the first set of fingerprints further causes the system to perform:
   generating a plot of the first set of fingerprints with respect to time.

15. The system of claim 11, wherein determining whether the content item and the encoded version of the content item are synchronized further causes the system to perform:
   determining a measure of similarity between the first curve and the second curve based at least in part on a correlation technique; and
   determining that an audio stream and a video stream of the encoded version of the content item are not synchronized based at least in part on the measure of similarity.

16. A non-transitory computer-readable storage medium including instructions that, when executed by at least one processor of a computing system, cause the computing system to perform a method comprising:
   generating a first set of fingerprints that correspond to at least one media stream of a content item, the first set of fingerprints being generated from one or more frames in the media stream of the content item;
   generating a second set of fingerprints that correspond to at least one media stream of an encoded version of the content item, the second set of fingerprints being generated from one or more frames in the media stream of the encoded version of the content item;
   plotting a first curve based at least in part on the first set of fingerprints;
   plotting a second curve based at least in part on the second set of fingerprints; and
   determining whether the encoded version of the content item is synchronized based at least in part on the plotted first curve and the second curve.

17. The non-transitory computer-readable storage medium of claim 16, wherein generating the first set of fingerprints that correspond to the at least one media stream of the content item further causes the computing system to perform:
   determining a respective fingerprint for at least some frames corresponding to the at least one media stream, wherein each fingerprint measures a complexity of the frame.

18. The non-transitory computer-readable storage medium of claim 16, wherein the complexity of the frame is determined based on at least one of a chroma value corresponding to the frame, a luma value corresponding to the frame, a number of bits corresponding to the frame, a frequency corresponding to the frame, a weight of the frame, or a combination thereof.

19. The non-transitory computer-readable storage medium of claim 16, wherein plotting the first curve based at least in part on the first set of fingerprints further causes the computing system to perform:
   generating a plot of the first set of fingerprints with respect to time.

20. The non-transitory computer-readable storage medium of claim 16, wherein determining whether the content item and the encoded version of the content item are synchronized further causes the computing system to perform:
   determining a measure of similarity between the first curve and the second curve based at least in part on a correlation technique; and
   determining that an audio stream and a video stream of the encoded version of the content item are not synchronized based at least in part on the measure of similarity.

* * * * *